US009214666B2

(12) United States Patent
Suzuki et al.

(10) Patent No.: US 9,214,666 B2
(45) Date of Patent: Dec. 15, 2015

(54) GRAPHITE MATERIAL WITH LATTICE DISTORTION FOR USE IN LITHIUM-ION SECONDARY BATTERY NEGATIVE ELECTRODES, AND LITHIUM-ION SECONDARY BATTERY

(71) Applicants: JX NIPPON OIL & ENERGY CORPORATION, Tokyo (JP); TODA KOGYO CORP., Hiroshima (JP); Setsumi Fujinaga, Yamaguchi (JP)

(72) Inventors: Takashi Suzuki, Kanagawa (JP); Noriyo Ishimaru, Kanagawa (JP); Takashi Oyama, Yamaguchi (JP); Tamotsu Tano, Yamaguchi (JP); Toshiyuki Oda, Yamaguchi (JP); Ippei Fujinaga, Yamaguchi (JP); Tomoaki Urai, Hiroshima (JP); Seiji Okazaki, Hiroshima (JP); Katsuaki Kurata, Hiroshima (JP); Toshiaki Hiramoto, Hiroshima (JP); Akino Sato, Hiroshima (JP); Wataru Oda, Hiroshima (JP)

(73) Assignees: JX NIPPON OIL & ENERGY CORPORATION, Tokyo (JP); TODA KYOGO CORP., Hiroshima (JP)

( * ) Notice: Subject to any disclaimer, the term of this patent is extended or adjusted under 35 U.S.C. 154(b) by 146 days.

(21) Appl. No.: 13/858,375

(22) Filed: Apr. 8, 2013

(65) Prior Publication Data

US 2013/0302692 A1  Nov. 14, 2013

Related U.S. Application Data

(63) Continuation of application No. PCT/JP2011/073095, filed on Oct. 6, 2011.

(30) Foreign Application Priority Data

Oct. 8, 2010 (JP) .................................. 2010-228988

(51) Int. Cl.
*H01M 4/13* (2010.01)
*H01M 4/583* (2010.01)
(Continued)

(52) U.S. Cl.
CPC ............... *H01M 4/133* (2013.01); *C01B 31/04* (2013.01); *H01M 4/1393* (2013.01); *H01M 4/587* (2013.01); *H01M 10/0525* (2013.01); *Y02E 60/122* (2013.01); *Y02T 10/7011* (2013.01)

(58) Field of Classification Search
CPC ............................. H01M 4/133; H01M 4/583
USPC ........................................ 429/231.8; 423/448
See application file for complete search history.

(56) References Cited

U.S. PATENT DOCUMENTS

| 5,910,383 A | 6/1999 | Hase et al. |
| 2006/0292447 A1 | 12/2006 | Suzuki |

(Continued)

FOREIGN PATENT DOCUMENTS

| JP | 7-335218 | 12/1995 |
| JP | 10-139410 | 5/1998 |

(Continued)

OTHER PUBLICATIONS

K. Eguchi et al., "Method for Manufacturing Graphite Material, Negative Pole Material for Lithium Ion Secondary Battery and Lithium on Secondary Battery", English-language Abstract of JP 2003-171110, published Jun. 17, 2003 (1 page).

(Continued)

*Primary Examiner* — Kenneth Douyette
*Assistant Examiner* — James Lee
(74) *Attorney, Agent, or Firm* — Finnegan, Henderson, Farabow, Garrett & Dunner, L.L.P.

(57) ABSTRACT

This disclosure concerns graphite materials having lattice distortion for lithium-ion secondary battery negative electrode obtained by a manufacturing method comprising the steps of: pulverizing and classifying a raw coke composition obtained from a heavy-oil composition undergone coking by delayed coking process, the raw coke composition having a H/C atomic ratio that is a ratio of hydrogen atoms H and carbon atoms C of 0.30 to 0.50 and having a micro-strength of 7 to 17 mass % to obtain powder of the raw coke composition; giving compressive stress and shear stress to the powder of the raw coke composition so that average circularity is 0.91 to 0.97 to obtain round powder; heating the round powder to obtain a carbonized composition; and graphitizing the carbonized composition.

2 Claims, 1 Drawing Sheet

(51) Int. Cl.
| | |
|---|---|
| *H01M 4/133* | (2010.01) |
| *C01B 31/04* | (2006.01) |
| *H01M 4/1393* | (2010.01) |
| *H01M 4/587* | (2010.01) |
| *H01M 10/0525* | (2010.01) |

(56) References Cited

U.S. PATENT DOCUMENTS

| | | | | |
|---|---|---|---|---|
| 2009/0130561 | A1* | 5/2009 | Matsumoto et al. | 429/231.8 |
| 2013/0089491 | A1* | 4/2013 | Tano et al. | 423/448 |
| 2013/0251620 | A1* | 9/2013 | Suzuki et al. | 423/448 |

FOREIGN PATENT DOCUMENTS

| | | |
|---|---|---|
| JP | 10-326611 | 12/1998 |
| JP | 2001-351627 | 12/2001 |
| JP | 4171259 | 10/2008 |
| WO | WO 2006-109497 A1 | 10/2006 |

OTHER PUBLICATIONS

K. Ariyoshi et al., "Twelve-Volt "Lead-Free" Accumulators consisting of LTO and LAMO: High and Low Temperature Examinations", Proceedings of the 48$^{th}$ Battery Symposium in Japan, 1A11, pp. 16-17, Nov. 13, 2007.

K. Ariyoshi et al., "Cycleability on the LTO/LAMO Cells for 12 V "Lead-Free"Accumulators", Proceedings of the 76$^{th}$ Meeting of the Electrochemical Society of Japan, 1P29, p. 366, Mar. 26, 2009.

T. Kobayashi et al., "Change of Charge-Discharge Region for Lithium Ion Secondary Batteries by High-Temperature Storage", Proceedings of the 71$^{st}$ Meeting of the Electrochemical Society of Japan, 2107, p. 241, Mar. 24, 2004.

J. Besenhard et al., "Filming mechanism of lithium-carbon anodes in organic and inorganic electrolytes", Journal of Power Sources, 54, pp. 228-231 (1995).

T. Yokono et al., "Characterization of Pitch II. Chemical Structure", Tanso, No. 105, pp. 73-81 (1981).

S. Mizushima, "On true crystallite thickness and interlayer spacing in graphitic carbons", Carbon, No. 52, . pp. 9-12 (1968).

The 117 Committee of the Japan Society for the Promotion of Sciences, "Procedure for the measurements of lattice parameters and crystallite sizes of carbon materials by X-ray diffraction", Tanso, No. 221, pp. 52-60 (2006).

English-language translation of International Search Report from the Japanese Patent Office in PCT International Application No. PCT/JP2011/073095 mailed Jan. 24, 2012.

International Preliminary Report on Patentability mailed May 10, 2013 from the International Bureau of WIPO in counterpart International Application No. PCT/JP2011/073095 (10 pages).

European Patent Office, Extended European Search Report for application No. 11830734.7, dated Mar. 2, 2015, 6 pages.

* cited by examiner

GRAPHITE MATERIAL WITH LATTICE DISTORTION FOR USE IN LITHIUM-ION SECONDARY BATTERY NEGATIVE ELECTRODES, AND LITHIUM-ION SECONDARY BATTERY

This application is a continuation application of PCT/JP2011/073095, filed on Oct. 6, 2011.

BACKGROUND OF THE INVENTION

1. Field of the Invention

The present invention relates to graphite materials used for negative electrodes of lithium-ion secondary batteries and a method for manufacturing the same. More specifically, the present invention relates to graphite materials used for negative electrodes of lithium-ion secondary batteries with suppressed capacity degradation and high durability, negative electrodes using the same and lithium-ion secondary batteries including the negative electrodes.

2. Description of Related Art

Lithium-ion secondary batteries are light in weight and have high input and output characteristics compared with conventional secondary batteries such as a nickel-cadmium battery, a nickel-metal hydride battery and a lead battery, and such lithium ion secondary batteries have been anticipated in recent years as power supplies for electric vehicles and hybrid vehicles. Typically, these kinds of batteries include a lithium-containing positive electrode enabling reversible intercalation of lithium and a negative electrode including a carbon material, and these electrodes are opposed to each other via a non-aqueous electrolyte. As such, these kinds of batteries are assembled in a discharged state, and so will not be in a dischargeable state without charging. The following describes the charge and discharge reaction by way of an example including a lithium cobalt oxide ($LiCoO_2$) as the positive electrode, a carbon material as the negative electrode and a non-aqueous electrolyte solution containing lithium salt as an electrolyte.

During charge of a first cycle, lithium contained in the positive electrode is firstly released to the electrolyte solution (the following Formula 1), so that the positive electrode potential shifts to a noble (positive) direction. At the negative electrode, lithium released from the positive electrode is occluded by the carbon material (the following Formula 2), so that the negative electrode potential shifts to a less noble direction. Typically when a difference between the positive electrode potential and the negative electrode potential, i.e., battery voltage reaches a predetermined value, the charge is terminated. This value is called a charge termination voltage. Then, during discharging, lithium occluded by the negative electrode is released, so that the negative electrode potential shifts to a noble direction, and the lithium is occluded again by the positive electrode, so that the positive electrode potential shifts to a less noble direction. Similarly to the charging, discharge also is terminated when a difference between the positive electrode potential and the negative electrode potential, i.e., battery voltage reaches a predetermined value. That value is called a discharge termination voltage. The whole reaction formula of such charge and discharge will be as in the following Formula 3. In the following second cycle or later, the charge and discharge reaction (cycles) progresses as lithium moves between the positive electrode and the negative electrode.

[Formula 1]

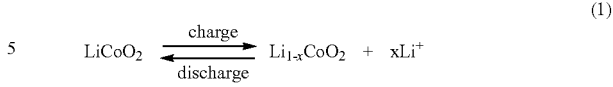
(1)

(2)

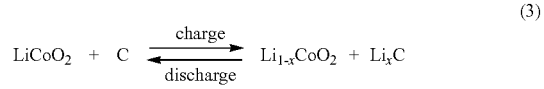
(3)

In general, carbon materials used for negative electrode materials of lithium-ion secondary batteries are broadly divided into graphite materials and amorphous materials. Graphite carbon materials have an advantage of having higher energy density per unit volume than amorphous carbon materials. As such, graphite carbon materials are typically used as a negative electrode material in a lithium-ion secondary battery for mobile phones and laptop computers that are required to be compact in size but have large charge and discharge capacity. Graphite has a structure including regularly laminated reticulated planes of carbon atoms, and during charge and discharge an intercalation and deintercalation reaction of lithium ions progresses at the edges of the reticulated planes.

As stated above, these kinds of batteries has been examined actively for the use as electric storage devices for vehicles, industry, and electric power supply infrastructure in recent years. When these batteries are used for these purposes, they are required to have extremely high-degree of reliability compared with the usage for mobile phones or laptop computers. The term "reliability" is a property related to product life, referring to a property of hardly changing (hardly deteriorating) in charge and discharge capacity and the internal resistance during repeated charge and discharge cycles, during storage while being charged to be a predetermined voltage or while being charged (floating charged) continuously at a constant voltage.

Meanwhile, it is generally known that lithium-ion secondary batteries conventionally used for mobile phones and laptops have service life characteristics greatly depending on the negative electrode materials as well. One of the reasons is that, due to low charge and discharge efficiency at the negative electrode, it is impossible in principle to make the charge and discharge efficiency identical between the positive electrode reaction (Formula 1) and the negative electrode reaction (Formula 2). The charge and discharge efficiency refers to a ratio of dischargeable electric capacity to the electric capacity consumed by charging. The following is a detailed description on a reaction mechanism to degrade the service life characteristics due to such low charge and discharge efficiency of the negative electrode reaction.

During charging, lithium is released from the positive electrode (Formula 1) and is occluded by the negative electrode (Formula 2) as stated above, where the reactions at the positive electrode and the negative electrode consume the same amount of electric capacity during charging. The charge and discharge efficiency, however, is lower at the negative electrode, so that during the subsequent discharging reaction, the discharge is terminated in the state in which the amount of lithium released from the negative electrode is less than the amount of lithium that can be occluded on the positive electrode side, i.e., the amount of lithium that has been occluded before the charge on the positive electrode side. This is because a part of the electric capacity consumed by charge at the negative electrode is consumed by a side reaction and a competitive reaction and not by the reaction of occluding lithium, i.e., the occlusion reaction as dischargeable capacity.

As a result of such a charge and discharge reaction, the positive electrode potential at the discharge termination state shifts to a nobler direction than the original potential before the charge and discharge, and the negative electrode potential also shifts to a nobler direction than the original potential before the charge and discharge. This results from the following reason. All lithium, which has been released during the charge of the positive electrode, cannot be occluded (not return to) during discharging, and thus, during discharging to make the potential shifted to a noble direction during charging shift to a less noble direction, the potential cannot return to the original positive electrode potential by an amount corresponding to a difference in charge and discharge efficiency between the positive and negative electrodes. Then discharge is terminated at a nobler potential than the original positive electrode potential. As stated above, since the discharge of a lithium-ion secondary battery ends when the battery voltage (i.e., a difference between the positive electrode potential and the negative electrode potential) reaches a predetermined value (discharge termination voltage), a nobler potential at the positive electrode at the time of discharge termination means that the negative electrode potential shifts accordingly to a noble direction.

As stated above, during the repeated charge and discharge cycles, these kinds of batteries produce a problem of a reduction in capacity obtainable within a predetermined voltage range (within the range between the discharge termination voltage and the charge termination voltage) due to a change of an operation range of the capacity of the positive and negative electrodes. Such reaction mechanism of the capacity degradation has been reported in an academic conference, for example, as well (for example, Proceedings of the 48th Battery Symposium in Japan, 1A11 (Nov. 13, 2007) and Proceedings of the 76th Meeting of the Electrochemical Society of Japan, 1P29 (Mar. 26, 2009)). Once the operation range of the positive and negative electrode potentials changes, such a change is irreversible, and so the operation range cannot return to the original one in principle. There is no means to recover the capacity, which makes this problem more serious.

The above-described reaction mechanism causing capacity degradation during repeated charge and discharge cycles basically applies to a reaction mechanism for the capacity degradation during storage in a charged state or reaction mechanism for the capacity degradation during float-charge. When a battery is stored in a charged state, it is known that the amount of capacity lost by a side reaction and a competitive reaction which occur in a charged state is greater in the negative electrode than in the positive electrode, so that an operation range of the capacity of the positive and negative electrode changes between before and after storage and so the battery capacity after storage decreases (for example, Proceedings of the 71st Meeting of the Electrochemical Society of Japan, 2I07 (Mar. 24, 2004)). A difference in self discharge rate between the positive and negative electrodes under a charged state also owes to, similar to the above-mentioned difference in charge and discharge efficiency between the positive and negative electrodes, a side reaction or competitive reaction rate at the negative electrode under a charged state being higher than a side reaction or competitive reaction rate at the positive electrode in a charged state.

When a battery is float-charged, both the positive electrode and the negative electrode are charged at predetermined potentials continuously at the initial stage of charging. Actually, however, a current value (leakage current on the positive electrode side) necessary for keeping the positive electrode potential and a current value (leakage current on the negative electrode side) necessary for keeping the negative electrode potential are different. This results from, as described above, self discharge rates under a charged state are different between the positive electrode and the negative electrode and the self discharge rate of the negative electrode is larger. At the time of float charging, a leakage current becomes larger on the negative electrode side than on the positive electrode side, so that a negative electrode potential is shifted to the decreasing direction of a leakage current, that is, the noble direction and a positive electrode potential is shifted to the increasing direction of a leakage current, that is, the noble direction. In this way, during float-charge as well, an operation range of the capacity of the positive electrode and the negative electrode changes irreversibly, leading to degradation in battery capacity.

Lithium-ion batteries including a graphite negative electrode made up of highly developed crystals can yield high electric capacity. A battery including such a graphite material is said to have a tendency of, concurrently with insertion of lithium in graphite crystals, co-insertion and decomposition of the electrolyte solution from edge parts of the crystallites in between graphite layers each being a reticulated plane with high-degree of parallelism (solvent co-insertion model of Besenhard, J. O. Besenhard, M. Winter, J. Yang, W. Biberacher, J. Power Sources, 54, 228 (1995)). A side reaction and a competitive reaction resulting from the decomposition of the electrolyte solution between graphite layers cause a reduction in charge and discharge efficiency of the negative electrode, thus causing capacity degradation. The tendency of the solvent co-insertion is said to increase in more developed graphite crystals. Thus, in order to suppress decomposition of the electrolyte solution due to the solvent co-insertion, a method of introducing disorder of a crystal structure at the surface of particles has been reported. Japanese Patent No. 4171259 describes, following pulverizing and classifying of a raw coke composition, a mechanochemical treatment performed thereto, whereby the crystal structure at the surface of particles can be disordered. The document describes, since such disorder of the crystal structure still remains as unorganized carbon after graphitization as the final step, the initial charge and discharge efficiency of the negative electrode can be improved (paragraph [0024] of Japanese Patent No. 4171259). The disorder of the crystal structure introduced by a mechanochemical treatment, however, is a state in which unorganized carbon crystallites are oriented at random, that is, a so-called isotropic state, in which many edge parts are probably exposed to the surface of particles.

In general, there are a large number of dangling bonds at the edge parts of crystallites, that is, a valence electron bond is not saturated and many localized electrons are present without a binding partner. On the surface of a negative electrode carbon material during charge, that is, at the interface where an electrolyte solution comes into contact with the carbon material, a side reaction or a competitive reaction occurs because the localized electrons catalytically act to cause reduction decomposition of the electrolyte solution in addition to the intended charging reaction causing insertion of lithium in graphite crystals, thus decreasing charge and discharge efficiency of the negative electrode. That is, although unorganized carbon introduced at the surface of particles may suppress the decomposition of electrolyte solution due to the solvent co-insertion, the edges will be exposed to the surface because crystallites of the unorganized carbon introduced are in an isotropic state, resulting in the stillremaining problem of increasing reduction decomposition of the electrolyte solution and causing capacity degradation.

SUMMARY OF THE INVENTION

In order to suppress the aforementioned capacity degradation of lithium-ion secondary batteries, it is an object of the present invention to develop a carbon material for negative electrodes that can suppress capacity degradation due to repeated charge and discharge cycles, storage under a charged state and float-charging, thus providing a material for negative electrodes of lithium-ion secondary batteries for applications requiring a high degree of reliability, such as vehicles, industry and electric power storage infrastructure.

The present inventors noted the possibility of improving the charge and discharge efficiency of the negative electrode by introducing lattice distortion to graphite crystallites to reduce the degree of parallelism of reticulated planes and providing a graphite material with less crystallite edges exposed at the particle surface, thus improving the reliability of a lithium-ion secondary battery, and examined this in detail. As a result, the present inventors have achieved the present invention.

That is, in order to solve the aforementioned problems, a first embodiment of the present invention is a graphite material for lithium-ion secondary battery negative electrode, the graphite material being obtained by a manufacturing method including the steps of: pulverizing and classifying a raw coke composition obtained from a heavy-oil composition undergone coking by delayed coking process, the raw coke composition having a H/C atomic ratio that is a ratio of hydrogen atoms H and carbon atoms C of 0.30 to 0.50 and having a micro-strength of 7 to 17 mass % to obtain powder of the raw coke composition; giving compressive stress and shear stress to the powder of the raw coke composition so that average circularity is 0.91 to 0.97 to obtain round powder; heating the round powder to obtain a carbonized composition; and graphitizing the carbonized composition. The graphite material has a size of a crystallite Lc(112) of 4 nm to 30 nm, the size being calculated from a (112) diffraction line obtained by X-ray wide-angle diffractometry and has lattice distortion in the range from 0.001 to 0.085, the lattice distortion being calculated from a (004) diffraction line and a (006) diffraction line.

In order to solve the aforementioned problems, a second embodiment of the present invention is a lithium-ion secondary battery including the graphite material for lithium-ion secondary battery negative electrode according to the first embodiment as a negative electrode material.

According to the embodiment of the present invention, since a negative electrode of a lithium-ion secondary battery includes a graphite material with appropriate lattice distortion, the lithium-ion secondary battery provided can have excellent service life characteristics.

DESCRIPTION OF THE PREFERRED EMBODIMENTS

Figure 1:
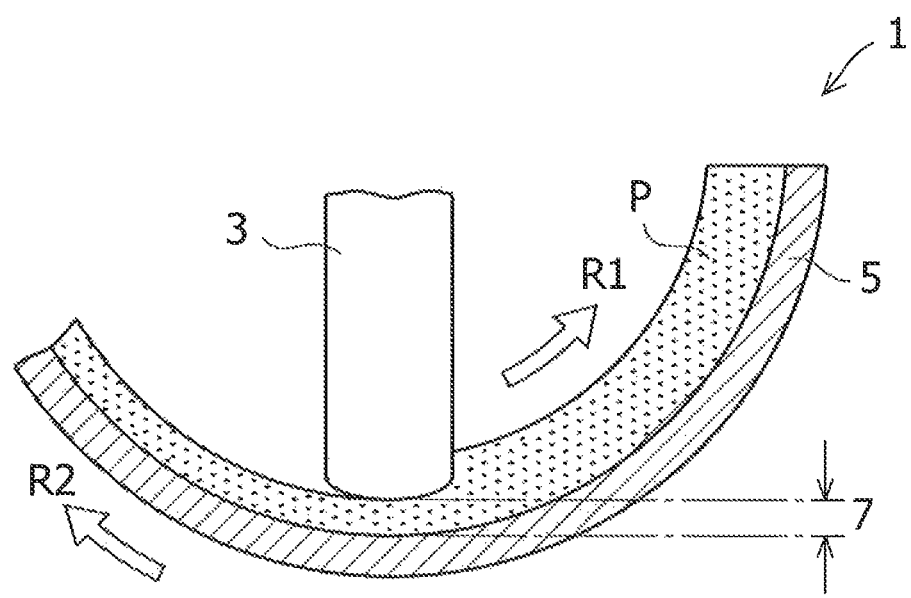
FIG. 1 shows an exemplary mechanofusion device.

Li insertion into graphite layers having high-degree of parallelism of their reticulated planes concurrently involves co-insertion of electrolyte solution between the graphite layers. This is a solvent co-insertion model, and in order to suppress the decomposition of the electrolyte solution described by such a model, lattice distortion has to be introduced to the particles internally so as to suppress the solvent co-insertion. The lattice distortion herein refers to a region having low-degree of parallelism of their reticulated planes, such a region being generated when the growth of crystallites is limited by a particle shape during the course of carbonization or graphitization or the growth of neighboring crystallites are inhibited mutually therebetween. In such a region with lattice distortion, the electrolyte solution hardly co-inserts between graphite layers because of low-degree of parallelism of their reticulated planes.

A first embodiment of the present invention is described below.

The present inventors made lattice distortion within a predetermined range after graphitization as follows. That is, a heavy-oil composition is subjected to a coking treatment by a delayed coking process, thus obtaining a raw coke composition having a H/C atomic ratio, which is a ratio between hydrogen atoms H and carbon atoms C, from 0.30 to 0.50 and having a micro-strength from 7 to 17 mass %. The raw coke composition is subjected to pulverizing and classifying, followed by a surface treatment so as to receive compressive stress and shear stress so that the average circularity is within the range of 0.91 to 0.97. The present inventors consider the relationship between the step of giving compressive stress and shear stress before graphitization and the generation of lattice distortion after graphitization as follows.

Round powder is obtained by subjecting heavy-oil composition to a coking treatment by a delayed coking process, thus obtaining a raw coke composition having a H/C atomic ratio, which is a ratio between hydrogen atoms H and carbon atoms C, from 0.30 to 0.50 and having a micro-strength from 7 to 17 mass %, and then subjecting the raw coke composition to pulverizing and classifying, followed by a surface treatment to give compressive stress and shear stress so that the average circularity is within the range of 0.91 to 0.97. When the thus obtained round powder is graphitized, crystallites during the graphitization grow among the round powder having high average circularity, i.e., among particles having large curvature of the surface, like in a so-called cast, meaning that the crystallites will grow while receiving limitation on the growth direction by the particle shape. In other words, crystallites grow differently depending on the form of particles.

For instance, crystallites grow widely and freely among flattened-shaped particles along the long axis of the particles. On the other hand, they cannot grow freely among particles having large curvature at the surface because spatial limitation due to the particle shape is given to the growth direction of crystallites. The spatial limitation means that the growth of crystallites is inhibited by energy to keep the particle shape, and the spatial limitation to the crystal growth increases with the average circularity of round powder, i.e., the curvature of the surface. In the following, an influence from the particle shape on the growth of crystallites is collectively called a shape effect.

The following describes a reason of the shape effect affecting the introduction of lattice distortion to graphite materials.

At a surface part of the round powder having average circularity within the range of 0.91 to 0.97, graphitization progresses in a competitive state between energy to grow the crystallites and energy to keep the particle shape. This means that the growth of crystallites is partially inhibited by the energy to keep the particle shape, so that a region with less-degree of parallelism of their reticulated planes, i.e., lattice distortion is introduced at the inhibited part. In such a state, graphitization progresses while storing the lattice distortion locally in the crystallites.

In general, graphitization progresses at a faster rate in the crystallites at the particle surface than in the crystallites inside the particles. Since crystallites are oriented at the particle surface along the particle shape, these crystallites aligned at the particle surface have an effect of giving spatial limitation to the crystallites inside the particles. In other words, graphitization of crystallites inside the particles also progresses in a competitive state between the energy to grow the crystallites and the energy to keep the orientation of the crystallites located at a position closer to the surface, whereby lattice distortion is introduced to the graphite there. That is, the shape effect of the particles is given to the inside of the particles as well by a ripple effect and is sufficient.

In the case in which the average circularity of round powder is less than 0.91, crystallites grow freely without being inhibited by the particle shape and without receiving the shape effect, so that no lattice distortion is introduced to the graphite. On the other hand, the surface treatment to give compressive stress and shear stress to a raw coke composition cannot yield the value of the average circularity of the round powder exceeding 0.97.

In this way, a manufacturing method to introduce distortion to particles preferably includes the step of graphitization progressing in a competitive state between energy to grow the crystallites and energy to keep the particle shape. As a manufacturing method to make such a state, round powder is preferably graphitized, the round powder being obtained by subjecting a raw coke composition to pulverizing and classifying, and then giving compressive stress and shear stress to the raw coke composition for a surface treatment so that the average circularity is within the range of 0.91 to 097.

In a first embodiment of the present invention, the crystal structure of a graphite material strongly depends on the crystalline organization (physical properties) of a raw coke composition as its precursor raw material. A raw coke composition having a physical property as recited in a first embodiment of the invention according to the present application, that is, having a H/C atomic ratio, which is a ratio between hydrogen atoms H and carbon atoms C, from 0.30 to 0.50 and having a micro-strength from 7 to 17 mass % is subjected to pulverizing and classifying, followed by a surface treatment to give compressive stress and shear stress, thus obtaining round powder with the average circularity within the range of 0.91 to 0.97, and the round powder is graphitized. A feature of the graphite material resides in including crystallites aligned orderly while locally having a region with less-degree of parallelism of their reticulated planes and less edge parts exposed to the particle surface.

A lithium-ion secondary battery including, as a negative electrode material, a graphite material having such a feature can realize extremely small leak current of the negative electrode and excellent service life characteristics because decomposition of electrolyte solution due to solvent co-insertion and decomposition of the electrolyte solution at edge parts of the particle surface can be suppressed.

Herein H/C of the raw coke composition is a ratio between a value obtained by dividing the total hydrogen content (TH (mass %)) by atomic weight of hydrogen and a value obtained by dividing the total carbon content (TC (mass %)) by atomic weight of carbon.

The total hydrogen can be found by complete combustion of a sample in an oxygen flow at 750° C., followed by measuring water content generated from combustion gas by a coulometric titration method (Karl Fischer method). In the coulometric titration-type Karl Fischer method, an electrolyte solution containing iodide ions, sulfur dioxide, base (RN) and alcohol as major components is put in a titration cell in advance, and then a sample is put in the titration cell so as to let water in the sample react as in the following Formula (4). Herein, the sample undergoes coking treatment, and then is cooled under a dry atmosphere and is measured, for example:

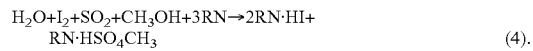

$$H_2O + I_2 + SO_2 + CH_3OH + 3RN \rightarrow 2RN \cdot HI + RN \cdot HSO_4CH_3 \qquad (4).$$

Iodine necessary for this reaction can be obtained through an electrochemical reaction (bielectron reaction) of iodide ions as in the following Formula (5):

$$2I^- + 2e^- \rightarrow I_2 \qquad (5).$$

Since 1 mol of water and 1 mol of iodine react, an electric quantity necessary for titration of 1 mg of water can be found by Faraday's law as in the following Formula (6):

$$(2 \times 96478)/(18.0153 \times 10^3) = 10.71 \text{ coulomb} \qquad (6).$$

Herein, the constant 96478 is the Faraday constant, and 18.0153 is the molar weight of water.

The electric amount required for the generation of iodine is measured, whereby the water content can be found. Further based on the thus obtained water content, conversion into the hydrogen content is performed, which is then divided by the mass of the sample used for the measurement, whereby the total hydrogen content (TH (mass %)) can be calculated.

The total carbon can be found by combustion of a sample in an oxygen flow at 1,150° C. so as to be converted into carbon dioxide (partially carbon monoxide) and be conveyed by an excess oxygen flow to a $CO_2 + CO$ infrared detector for calculation of the total carbon content (TC (mass %)).

The micro-strength is a value obtained as follows. That is, 2 g of a sample of 20 to 30 mesh and 12 pieces of rigid spheres of 5/16 inch (7.9 mm) in diameter are put in a steel cylinder (inner diameter 25.4 mm, length 304.8 mm) and the vertical face of the cylinder is rotated 800 times at 25 rpm in a direction orthogonal to the tube (i.e., rotated from the cylinder-standing state so that the top and the bottom of the cylinder are changed while keeping the rotational axis horizontal as if a propeller rotated). Thereafter sieving using 48 mesh is performed, and the value is obtained by representing the mass on the sieve with respect to the sample as a percentage.

In the case of the H/C atomic ratio of a raw coke composition less than 0.30, crystallites tend to grow extremely during graphitization. That is, round powder is obtained by giving compressive stress and shear stress to such a raw coke composition for a surface treatment so that the average circularity is within the range of 0.91 to 0.97, and the round powder is graphitized. The graphitization, however, will progress while decreasing the average circularity of the round powder because energy to grow crystallites is much larger than energy to keep the particle shape. Graphitization progressing in such a state is not preferable because a graphite material having appropriate lattice distortion in particles cannot be obtained.

On the other hand, in the case of the H/C atomic ratio in the raw coke composition exceeding 0.50, since the structure of its carbon frame is not formed sufficiently, the growth of crystallites is very small after graphitization. A lithium-ion secondary battery including, as a negative electrode, such a graphite material is not preferable because the capacity thereof is small.

As stated above, H/C of the raw coke material is limited to 0.30 to 0.50. Compressive stress and shear stress are given to a raw coke material having a physical property in this range for a surface treatment so that the average circularity is within the range of 0.91 to 0.97, and the round powder obtained is graphitized. Then, the resultant graphite material includes crystallites appropriately grown and having appropriate lattice distortion. Then, a lithium-ion secondary battery including, as a negative material, a graphite material having such a feature can realize extremely small leak current of the negative electrode and excellent service life characteristics because decomposition of electrolyte solution due to solvent co-insertion and decomposition of the electrolyte solution at edge parts of the particle surface can be suppressed.

The first embodiment of the invention according to the present application further specifies the micro-strength of a raw coke composition of 7 to 17 mass %. This micro-strength is an index indicating a bonding strength between neighboring crystallites. Between neighboring crystallites typically exists unorganized carbon having a structure other than a benzene ring as a structural unit of the reticulated planes, which has a function of bonding neighboring crystallites. This unorganized carbon survives after carbonization and graphitization of the raw coke composition and plays a similar role. The unorganized carbon herein refers to carbon that is not incorporated into carbon reticulated planes, and has a feature of being gradually captured into the carbon reticulated planes as the treatment temperature rises while inhibiting growth or selective orientation of neighboring carbon crystallites.

In the case of the micro-strength of the raw coke composition less than 7 mass %, the bonding strength between neighboring crystallites is extremely weak. Compressive stress and shear stress are given to such a raw coke material for a surface treatment so that the average circularity is within the range of 0.91 to 0.97, and the round powder is graphitized. At this time, the resultant graphite material cannot keep the particle shape of the powder made of the raw coke composition because of weak binding between crystallites, meaning that graphitization progresses while decreasing the curvature of the particle surface. Graphitization progressing in such a state is not preferable because a graphite material having appropriate lattice distortion cannot be obtained.

On the other hand, in the case of the micro-strength of the raw coke composition exceeding 17 mass %, the bonding strength between neighboring crystallites becomes extremely large. This is because unorganized carbon existing between neighboring crystallites configures a firm three-dimensional chemical bonding with its neighboring crystallites. Compressive stress and shear stress are given to such a raw coke material for a surface treatment so that the average circularity is within the range of 0.91 to 0.97, and the round powder obtained is graphitized. At this time, since the unorganized carbon has large energy to inhibit the selective orientation of crystallites, the shape effect of the particles cannot be exerted sufficiently. As a result, graphitization progresses while decreasing the curvature of the particle surface. Graphitization progressing in such a state is not preferable because a graphite material having appropriate lattice distortion cannot be obtained.

As stated above, the micro-strength of the raw coke composition is limited to 7 to 17 mass %. Compressive stress and shear stress are given to a raw coke material having a physical property in this range for a surface treatment so that the average circularity is within the range of 0.91 to 0.97, and the round powder obtained is graphitized. Then, the resultant graphite material has extremely less edge parts exposed to the particle surface and has appropriate lattice distortion. Then, a lithium-ion secondary battery including, as a negative material, a graphite material having such a feature can realize extremely small leak current of the negative electrode and excellent service life characteristics because decomposition of electrolyte solution due to solvent co-insertion and decomposition of the electrolyte solution at edge parts of the particle surface can be suppressed.

In this way, as long as compressive stress and shear stress are given to a raw coke material having a H/C atomic ratio from 0.30 to 0.50 and having a micro-strength from 7 to 17 mass % for a surface treatment so that the average circularity of round powder obtained is within the range of 0.91 to 0.97, and the round powder is graphitized, the resultant graphite material includes crystallites appropriately grown and having appropriate lattice distortion as well as extremely less edge parts exposed to the particle surface. Then, a lithium-ion secondary battery including, as a negative material, such a graphite material can realize excellent service life characteristics because decomposition of electrolyte solution due to solvent co-insertion and decomposition of the electrolyte solution at edge parts of the particle surface can be suppressed.

In the first embodiment of the invention according to the present application, compressive stress and shear stress are given to a raw coke material so that the average circularity of round powder obtained is within the range of 0.91 to 0.97. This is because the circularity less than 0.91 means that energy to keep the particle shape is much smaller than energy to grow crystallites during graphitization, thus failing to form a competitive state of these energies. Graphitization progressing in such a state is not preferable because no lattice distortion can been introduced.

Meanwhile, the manufacturing method of the present invention that gives compressive stress and shear stress to a raw coke material cannot yield round powder having the average circularity exceeding 0.97. This is because, when very intense compressive stress and shear stress are given to a raw coke material so as to obtain round powder having the average circularity exceeding 0.97, considerable cracks occur on the particle surface, thus causing collapse of the particles. Collapse of the particles makes the powder obtained after a surface treatment extremely small in particle size and including a large quantity of fine powder. A graphite material obtained by carbonization and graphitization of such powder will have an extremely large specific surface. A lithium-ion secondary battery including, as a negative electrode, such a graphite material is not preferable because the contact area of the graphite and the electrolyte solution is extremely large, thus increasing decomposition of the electrolyte solution and increasing leak current of the negative electrode.

In the first embodiment of the invention according to the present application, the graphite material has the value of Lc(112) from 4 nm to 30 nm, the value of Lc(112) being calculated from a (112) diffraction line obtained by X-ray wide-angle diffractometry and lattice distortion in the range from 0.001 to 0.085, the lattice distortion being calculated from a (004) diffraction line and a (006) diffraction line. The reason for this is described below.

A graphite material with the value of Lc(112) less than 4 nm means insufficient development of the crystal structure, and a lithium-ion secondary battery including such a graphite material is not preferable because of small capacity. Then, the raw coke composition of the present invention, even subjected to graphitization at a high temperature, does not have the value of Lc(112) exceeding 30 nm, and so the upper limit is set at 30 nm.

A larger value of Lc(112) leads to high-degree of graphitization, leading to high-degree of parallelism of reticulated planes and so leading to a tendency to decrease lattice distortion. When a graphite material obtained by a conventional manufacturing method has the value of Lc(112) ranging from 4 nm to 30 nm, lattice distortion of 0.001 or more cannot be introduced. Such a graphite material is not preferable because, due to high-degree of parallelism of their reticulated planes, the electrolyte solution is easily co-inserted between graphite layers for decomposition.

On the other hand, the manufacturing method of the present invention giving compressive stress and shear stress to a raw coke composition enables lattice distortion of 0.001 or more to be introduced in a graphite material having the value of Lc(112) ranging from 4 nm to 30 nm as well. Such a graphite material includes crystallites appropriately grown and having appropriate lattice distortion, and a lithium-ion secondary battery including, as a negative material, such a graphite material can realize extremely small leak current of the negative electrode and excellent service life characteristics because decomposition of electrolyte solution due to solvent co-insertion can be suppressed.

Meanwhile, the manufacturing method of the present invention cannot introduce lattice distortion exceeding 0.085 to a graphite material having the value of Lc(112) in the range of 4 nm to 30 nm, and so the upper limit is set at 0.085.

A raw coke composition used for the present invention can be obtained by subjecting a heavy-oil composition to a coking treatment by a delayed coking process.

Exemplary components of the heavy-oil composition include bottom oil of fluid catalytic cracker (fluid catalytic cracking residue oil, FCC DO), an aromatic component extracted from fluid catalytic cracking residue oil, hydrodesulfurization oil obtained by highly hydrodesulfurization of heavy oil, vacuum residue oil (VR), desulfurized deasphalted oil, coal liquefaction oil, coal solvent extraction oil, atmospheric residue oil, shale oil, tar sand bitumen, naphtha tar pitch, ethylene bottom oil, coal tar pitch and heavy oil by hydrorefining of the foregoing. When two or more types of these heavy-oils are blended to prepare the heavy-oil composition, the blending ratio may be appropriately adjusted according to the properties of the stock oils used so that a raw coke composition obtained after coking by a delayed coking process of the heavy-oil composition has the H/C atomic ratio of 0.30 to 0.50 and the micro-strength of 7 to 17 mass % as physical properties thereof. The stock oil properties may vary depending on the type of crude oil and the processing conditions employed until the stock oil is obtained from the crude oil.

The bottom oil of fluid catalytic cracker may be bottom oil of a fluidized-bed fluid catalytic cracker that uses vacuum gas oil as stock oil and urging a selective decomposition reaction using a catalyst, thus obtaining high-octane FCC gasoline. The vacuum gas oil used as the stock oil is preferably desulfurized vacuum gas oil that is obtained by direct-desulfurization of atmospheric distillation residue oil (preferably sulfur content of 500 mass ppm or lower, density at 15° C. of 0.8 g/cm³ or more).

The aromatic component extracted from fluid catalytic cracking residue oil is obtained as follows. Extraction is selectively performed using dimethylformamide or the like, and then the resultant is separated into an aromatic component and a saturated component, thus obtaining the aromatic component.

The hydrodesulfurization oil obtained by highly hydrodesulfurization of heavy oil is obtained by subjecting, for example, heavy oil having sulfur content of 1 mass % or more to a hydrodesulfurization treatment at the hydrogen partial pressure of 10 MPa or more, thus obtaining the heavy oil having sulfur content of 1.0 mass % or less, nitrogen content of 0.5 mass % or less and an aromatic carbon fraction (fa) of 0.1 or more. Then, the hydrodesulfurization oil is preferably one obtained by subjecting atmospheric distillation residue oil to hydrodesulfurization in the presence of a catalyst to give its hydrogenolysis rate of 25% or less.

The vacuum residue oil (VR) is obtained as follows. Crude oil is subjected to atmospheric distillation, thus obtaining gas, light oil and atmospheric residuum, and this atmospheric residue oil is subjected under reduced pressure of 10 to 30 Torr and at a temperature ranging from 320 to 360° C., for example, thus obtaining bottom oil of the vacuum distillation as the vacuum residue oil (VR).

The desulfurized deasphalted oil is obtained by subjecting oil such as vacuum distillated residue oil to solvent deasphalting using propane, butane, pentane or the mixture of the foregoing as the solvent to remove the asphaltene component, thus obtaining deasphalted oil (DAO). Then, the thus obtained deasphalted oil (DAO) is desulfurized by indirect desulfurization equipment (Isomax) or the like to be the sulfur content of 0.05 to 0.40 mass %, preferably.

The atmospheric residue oil is obtained by subjecting crude oil to atmospheric distillation for heating under atmospheric pressure, for example, thus separating the components into gas LPG, gasoline fraction, kerosene fraction, light oil fraction and atmospheric residue oil depending on different boiling points of the fractions included, among which the atmospheric residue oil is the fraction having the highest boiling point. The heating temperature varies with the production area of the crude oil, which is not limited in particular as long as these fractions can be obtained by fractional distillation, and for example crude oil may be heated to 320° C.

Especially preferable exemplary heavy-oil compositions include a heavy-oil composition satisfying three conditions of: (1) having an aromatic carbon fraction (aromatic index) fa of 0.3 to 0.65; (2) having a normal paraffin content of 5 to 20 mass %; and (3) containing desulfurized deasphalted oil in the range of 7 to 15 mass %.

Heavy oil subjected to a high-temperature treatment generates thermal decomposition and polycondensation reactions, thus producing raw coke via the process to produce large liquid crystals known as mesophase as an intermediate product. At this time, it is especially preferable to use a stock oil composition containing all of the following components: (1) a heavy-oil component forming favorable bulk mesophase; (2) a heavy-oil component that can produce gas having a function to limit the size of a reticulated planes lamination configuring the mesophase during polycondensation of the mesophase for carbonization and solidification, and further (3) a component bonding these disconnected reticulated planes laminations. (1) The heavy-oil component forming favorable bulk mesophase is a component giving 0.3 to 0.65 as the aromatic index fa, (2) the heavy-oil component that can produce gas is a component corresponding to 5 to 20 mass % of the normal paraffin content, and (3) the component bonding the reticulated planes laminations is the desulfurized deasphalted oil contained in the range of 7 to 15 mass %.

Such a heavy-oil composition is preferably used as a raw material of the raw coke composition of the present invention because reticulated planes formed with a heavy-oil component generating favorable bulk mesophase are limited to a relatively small size, and thus the average circularity can be easily improved and additionally the desulfurized deasphalted oil can bond neighboring reticulated plane laminations appropriately. For the average circularity in the range of 0.91 to 0.97, the crystallites have to have a small size to alleviate the internal stress against compressive stress and shear stress so as to make the particles in an easy-deformed state.

The aromatic carbon fraction or aromatic index (fa) can be found by the Knight method. According to the Knight method, the distribution of carbon is, as the spectrum of aromatic carbon obtained by the $^{13}$C-NMR method, divided into three components ($A_1, A_2, A_3$), in which $A_1$ corresponds to the number of carbons in an aromatic ring, substituted aromatic carbons and half of unsubstituted aromatic carbons (corresponding to the peak of about 40 to 60 ppm in $^{13}$C NMR); $A_2$ corresponds to the other half of the unsubstituted aromatic carbons (corresponding to the peak of about 60 to 80 ppm in $^{13}$C-NMR); and $A_3$ corresponds to the number of aliphatic carbons (corresponding to the peak of about 130 to 190 ppm in $^{13}$C-NMR). Based on them, fa is found by the following expression:

$$fa=(A_1+A_2)/(A_1+A_2+A_3).$$

According to the document: "Characterization of Pitch II. Chemical Structure" Yokono and Sanada, Tanso No. 105, p 73-81 (1981), the $^{13}$C-NMR method is the best method for quantitatively determining fa, which is the most basic parameter among the chemical structure parameters of pitches.

The content of normal paraffin of the stock oil composition is the value measured using a capillary column-mounted gas chromatograph. Specifically, after verification of normal paraffin with a reference substance, a non-aromatic component sample separated by the elution chromatography is passed through the capillary column for measurement. The content can be calculated from this measured value based on the total mass of the stock oil composition.

When the aromatic index fa of the heavy-oil composition is less than 0.3, the yield of coke from the heavy-oil composition will be drastically degraded, and additionally favorable bulk mesophase cannot be formed and unfavorably a crystal structure is hardly developed during carbonization and graphitization. On the other hand, the aromatic index fa exceeding 0.65 generates lots of mesophases suddenly in the matrix during the course of raw coke production. This will mainly cause sudden coalescence of mesophases instead of single growth of itself. As a result, since the coalescence rate of mesophases is larger than the generation rate of gas from the normal paraffin containing component, it becomes impossible to limit the size of reticulated planes of bulk mesophase to be small unfavorably.

In this way, the aromatic index fa of the heavy-oil composition is especially preferably in the range of 0.3 to 0.6. The value of fa can be calculated from density D and viscosity V of the heavy-oil composition, and the heavy-oil composition especially preferably has the density D of 0.91 to 1.02 g/cm$^3$ and the viscosity of 10 to 220 mm$^2$/sec, and has the value of fa of 0.3 to 0.6.

The normal paraffin component appropriately contained in the heavy-oil composition plays an important role of generating gas during a coking treatment so as to limit the size of bulk mesophase to be small. The gas generated further has a function of allowing neighboring mesophases with a limited smaller size to be oriented uniaxially for selective orientation of the system as a whole. The content of the normal paraffin contained component less than 5 mass % leads to unnecessary growth of mesophases, so that huge carbon reticulated planes will be formed unfavorably. The content exceeding 20 mass % causes excess generation of gas from the normal paraffin, which tends to act in the tendency to disarrange the orientation of the bulk mesophase and causes the difficulty in developing of a crystal structure even with carbonization/graphitization unfavorably. As stated above, the content of the normal paraffin is especially preferably in the range of 5 to 20 mass %.

As mentioned above, the desulfurized deasphalted oil plays a role of bonding neighboring reticulated plane laminations appropriately. The content of the desulfurized deasphalted oil in the heavy-oil composition is especially preferably in the range of 5 to 20 mass %. In the case of less than 5 mass % or exceeding 20 mass %, the coking oil composition obtained after coking treatment will unfavorably have a micro-strength of less than 7 mass % or exceeding 17 mass %.

The heavy-oil composition having such features is subjected to coking treatment, whereby the raw coke composition of the present invention is formed. As a method for coking of a heavy-oil composition satisfying predetermined conditions, a delayed coking is preferable. More specifically, a preferable method is to heat-treat a heavy-oil composition by a delayed coker under a condition of controlled coking pressures to obtain raw coke. At this time, preferable operational conditions of the delayed coker are the pressure of 0.1 to 0.8 MPa and the temperature of 400 to 600° C.

Such a preferable range is set for the operational pressure of the coker because the emission rate of gas generated from normal paraffin containing component to the outside the system can be limited by pressure. As stated above, since the size of carbon reticulated planes configuring mesophase is controlled by the gas generated, the residence time of the generated gas in the system is an important control parameter to determine the size of the reticulated planes. Such a preferable range is set for the operational temperature of the coker because such temperatures are required for the growth of mesophase from the heavy oil prepared to obtain the advantageous effects of the present invention.

The thus obtained raw coke composition is pulverized and classified using a mechanical pulverizer (e.g., "Super Rotor Mill", product of Nisshin Engineering), to obtain a powder-form raw coke composition. Then, the resultant is classified using a precision air classifier (e.g., "Turbo Classifier", product of Nisshin Engineering) to obtain a powder-form raw coke composition with the average particle size of 5 to 30 µm. The average particle size is based on the measurement by a laser diffraction particle size analyzer. The average particle size of 5 to 30 µm is set because the particle size smaller than 5 µm fails to give sufficient compressive stress and shear stress to the powder-form raw coke composition, thus making it impossible to obtain round powder having the average circularity in the range of 0.91 to 0.97. The size of 30 µm or less is set because this size is typically suitably used as a negative electrode carbon material of a lithium ion secondary battery.

After pulverizing and classifying of the raw coke composition, compressive stress and shear stress are given thereto, thus obtaining round powder. A treatment to improve the average circularity of the round powder may be the degree of not affecting the apparent particle size substantially. This includes the form having unevenness like a potato on the surface as well. Specifically, the surface treatment is preferably performed so that the average circularity of the round powder is 0.91 to 0.97.

The average circularity can be measured using a circularity measurement instrument (e.g., flow particle imaging instrument FPIA-3000, product of Sysmex Corp.). The average circularity may be calculated by the following formula, and the average of circularities of the round powder is then calculated:

$$\text{Average circularity} = L_0/L,$$

wherein $L_0$ denotes the boundary length of the circle having the same projection area as that of the particle image, and L denotes the boundary length of the particle projected image.

When compressive stress and shear stress are given to the coal raw coke composition, collision, friction and rheological stress also are generated as well as the compressive stress and the shear stress. Mechanical energy from these stresses is greater than energy from general agitation, and so such energy given to the particle surface exerts the effect called a mechanochemical phenomenon such as spheronization of the particle shape or combination of particles. In order to give the mechanical energy to generate the mechanochemical phenomenon in the raw coke composition, a device capable of applying stresses such as shear, compression and collision simultaneously may be used, which is not limited especially for the structure and the principle of the device. For instance, a ball-type kneader such as a rotating ball mill, a wheel-type kneader such as an edge runner, a hybridization system (product of Nara Machinery Co., Ltd), Mechanofusion (product of Hosokawa Micron Corp.), Nobilta (product of Hosokawa Micron Corp.) and COMPOSI (product of Nippon Coke & Engineering Co., Ltd.) may be available, for example.

Manufacturing conditions at the step of giving compressive stress and shear stress may be different from the devices used, and for instance, as shown in FIG. 1, a mechanofusion device 1 may be used, including a blade 3 and a housing 5 that are relatively rotated, preferably in the mutually opposite directions (rotating directions R1, R2) so that compaction and compressive stress are applied to powder P at a space 7 between the blade and the housing.

When using Nobilta (product of Hosokawa Micron Corp.), the number of rotations of the blade is 1,500 to 5,000 rpm and the processing time is 10 to 180 minutes preferably. A number of rotations less than 1,500 rpm or a processing time less than 10 minutes fails to give sufficient compressive stress and shear stress to the powder-form raw coke composition. On the other hand, the processing longer than 180 minutes will give excessive compressive stress and shear stress to the powder-form raw coke composition, thus causing marked deformation of the particle shape unfavorably.

When using COMPOSI (product of Nippon Coke & Engineering Co., Ltd.), the circumferential velocity is 50 to 80 m/s and the processing time is 10 to 180 minutes preferably. The circumferential velocity smaller than 50 m/s or the processing time less than 10 minutes fails to give sufficient compressive stress and shear stress to the powder-form raw coke composition. On the other hand, the processing longer than 180 minutes will give excessive compressive stress and shear stress to the powder-form raw coke composition, thus causing marked deformation of the particle shape unfavorably.

When using Mechanofusion (product of Hosokawa Micron Corp.), the number of rotations of the blade is 500 to 3,000 rpm and the processing time is 10 to 300 minutes preferably. A number of rotations less than 500 rpm or a processing time less than 10 minutes fails to give sufficient compressive stress and shear stress to the powder-form raw coke composition. On the other hand, processing longer than 300 minutes will give excessive compressive stress and shear stress to the powder-form raw coke composition, thus causing marked deformation of the particle shape unfavorably.

When using a hybridization system (product of Nara Machinery Co., Ltd), the circumferential velocity is 40 to 60 m/s and the processing time is 5 to 180 minutes preferably.

The raw coke composition in the present application is preferably surface-treated to receive compressive stress and shear stress at a control temperature ranging from 60 to 250° C., whereby a graphite precursor with higher-degree of average circularity can be obtained. The operation at control temperatures for heat treatment ranging from 120 to 200° C. is especially preferable.

The surface treatment to apply compressive stress and shear stress to the particles of the raw coke composition is to grind corners of the particles, and as soon as being ground, the ground parts are attached to particles to round the particles. Such a treatment is preferably performed so as not to change the apparent particle size substantially. In this way, this treatment is not pulverization to generate minute powder and to make the particle size smaller. The raw coke composition includes a volatile component and so is adhesive, and this adhesiveness preferably acts to facilitate the prompt attachment of the ground parts to the particles.

A method for a graphitization treatment is not limited especially, and typically includes carbonization (prebake) under an inert gas atmosphere such as nitrogen, argon or helium at the maximum achieving temperature of 900 to 1,500° C. to be held for 0 to 10 hours, followed by heating under a similar inert gas atmosphere at the maximum achieving temperature of 2,500 to 3,200° C. to be held for 0 to 100 hours.

In general, a graphite material heat-treated at a graphitization temperature of 2,800° C. or higher has a developed state of crystallization, and so a lithium-ion secondary battery including such a material as a negative electrode has large capacity. However, since decomposition of the electrolyte solution easily occurs due to solvent co-insertion, its service life characteristics deteriorates. The present invention capable of achieving both of high capacity and high-level of service life characteristics has the significance of existence.

In this way, a graphite material can be obtained, having the size Lc(112) of the crystallite of 4 nm to 30 nm, the Lc(112) being calculated from a (112) diffraction line obtained by X-ray wide-angle diffractometry and having the lattice distortion of 0.001 to 0.085, the lattice distortion being calculated from a (004) diffraction line and a (006) diffraction line.

The following describes a method to find lattice distortion based on a (004) diffraction line and a (006) diffraction line obtained by X-ray wide-angle diffractometry.

In general, the crystal size L can be found as follows using a half-value width $\beta$ of the X-ray diffraction:

$$\beta = \lambda/L \cdot \cos\theta \tag{7},$$

wherein $\lambda$ denotes a wavelength of X-ray and $\theta$ denotes a Bragg angle.

Expression 7 can be converted as follows:

$$1/L = \beta \cdot \cos\theta/\lambda \tag{8}.$$

Note here that it has been stated that $\beta$ is the sum of $\beta(0)$ based on the true size of a crystallite and the width $\Delta\theta$ due to lattice distortion (Tanso, vol. 52, pp. 9 to 12 (1968)), and this can be represented as follows:

$$\beta = \beta(0) + \Delta\theta \tag{9}.$$

$\beta(0)$ can be represented as follows using the true size of a crystallite $L(0)$:

$$\beta(0) = \lambda/L(0) \cdot \cos\theta \tag{10}.$$

$\Delta\theta$ results from nonuniformity of the interplanar spacing d, and can be represented as follows, letting the variation width of the interplanar spacing $\Delta d$:

$$\Delta\theta = (\Delta d/d) \cdot \tan\theta = \epsilon \cdot \tan\theta \tag{11},$$

wherein $\epsilon = \Delta d/d$. $\epsilon$ in this expression is called lattice distortion.

From Expressions 9, 10 and 11, $\beta$ can be represented as follows:

$$\beta = \lambda/L(0) \cdot \cos\theta + \epsilon \cdot \tan\theta \tag{12}.$$

Substituting Expression 12 to β in Expression 8, the following expression can be obtained:

$$1/L = 1/L(0) + n(\epsilon/2d) \quad (n=1,2,3\ldots) \tag{13}$$

This means that plotting 1/L versus diffraction order n, the resultant will be a straight line, and the gradient of the straight line corresponds to the lattice distortion ε. A method to find the lattice distortion in this way has been shown in the document (Tanso, vol. 52, pp. 9 to 12).

Specifically, following Lc(004) and Lc(006) by X-ray analysis, their reciprocals (1/Lc) are found. Plotting these values with reference to the diffraction order to make a straight line, the lattice distortion ε is then calculated based on the gradient of the straight line. The diffraction orders of (004) and (006) are n=2 and 3, respectively.

The crystallite size Lc(112) of graphite powder is calculated as follows.

The obtained graphite powder is mixed with 10 mass % of a Si reference sample as an internal reference, which is put into a rotary sample holder (25 mmφ (diameter)×0.2 mm t (thickness)) made of glass. Then measurement by X-ray wide-angle diffractometry is performed based on the method specified by Japan Society for the Promotion of Science, Committee No. 117 (Tanso 2006, No. 221, pp. 52 to 60), whereby the size of the graphite powder Lc(112) is calculated. The X-ray diffractometer used is D8 ADVANCE (sealed tube type), product of Bruker-AXS, where CuKα radiation (Kβ filter Ni is used) is used as an X-ray source, and applied voltage and current to an X-ray vacuum tube are set at 40 kV and 40 mA, respectively.

The diffraction pattern thus obtained is analyzed also based on the method specified by Japan Society for the Promotion of Science, Committee No. 117 (Tanso 2006, No, 221, pp. 52 to 60). Specifically, the measurement data thus obtained is processed by smoothing and background removal, followed by absorption correction, polarization correction, and Lorentz correction. Then, using the peak position and value width of the Si reference sample (422) for correction against the diffraction curve (112) of the graphite powder, the crystallite size is calculated. The crystallite size is calculated from the corrected peak half-value width using the following Scherrer equation. The measurement and analysis are each conduct three times and the average is set as Lc(112):

$$L = K \times \lambda / (\beta_0 \times \cos\theta_B) \quad \text{Scherrer equation,}$$

wherein
L represents a crystallite size (nm);
K represents a shapefactor constant (=1.0);
λ represents a X-ray wavelength (=0.15406 nm);
$\theta_B$ represents a Bragg angle; and
$\beta_0$ represents a half-value width (corrected value).

Measurement results of Lc(112) of the graphite powder are as shown in Table 1.

A method for producing a negative electrode of a lithium-ion secondary battery includes, but not especially limited to, pressure molding of a mixture (negative electrode mixture) containing the carbon material according to the present invention, a binder (binding agent), and if necessary a conductive aid and organic solvent into a predetermined size. Another method for producing a negative electrode may include kneading of the carbon material according to the present invention, a binder (binding agent), a conductive aid and the like in an organic solvent to obtain a slurry, applying the slurry to a collector such as copper foil for drying (negative electrode mixture), rolling the same, and then cutting the roll into a predetermined size.

The graphite material for lithium ion batteries of the present invention may be mixed with a binder (binding agent) to be a mixture for negative electrode, and the mixture may be applied to metal foil, thus obtaining a negative electrode.

Examples of the binder, which is not limited especially and may be any conventionally used binder, include polyacrylonitrile (PVA), polyethylene terephthalate, polyvinylidene fluoride (PVDF), polytetrafluoroethylene (PTFE), polyvinyl fluoride and SBR (styrene-butadiene rubber).

The content of the binder is typically 1-40 parts by mass with respect to 100 parts by mass of the graphite material for lithium ion batteries of the present invention, is preferably 2 to 25 parts by mass and particularly preferably 5 to 15 parts by mass.

Examples of the conducting aid include carbon black, graphite, acetylene black, a conductive indium-tin oxide, or a conductive polymer such as polyaniline, polythiophene or polyphenylenevinylene. The amount of conducting aid used is preferably 1 to 15 parts by mass with respect to 100 parts by mass of the carbon material.

The mixture for negative electrode is mixed with solvent in a slurry form.

Examples of solvent, which is not limited especially and may be any conventionally used solvent, include N-methylpyrrolidone (NMP), pyrrolidone, N-methylthio-pyrrolidone, dimethylformamide (DMF), dimethylacetamide, hexamethylphosphamide, isopropanol and toluene, which may be used alone or in combination.

The content of the solvent is typically 15 to 90 parts by mass with respect to 100 parts by mass of the mixture for negative electrode as a whole, and preferably 30 to 60 parts by mass.

The mixture for negative electrode has to be dispersed appropriately at the degree of not breaking the graphite material for lithium ion batteries. To this end, the mixture of negative electrode is appropriately mixed and dispersed using a planetary mixer, a ball mill, a screw-type kneader or the like.

The slurry-form mixture of the mixture for negative electrode and the solvent is applied to metal foil. A material for the metal foil is not limited especially, and may be made of various metal materials. Examples include copper, aluminum, titanium, stainless steel, nickel and iron. The mixture is applied to a single face or double faces of the metal foil, followed by drying, whereby an electrode can be made.

The mixture may be applied by a conventionally well-known method, such as extrusion coating, gravure coating, curtain coating, reverse-roll coating, dip coating, doctor coating, knife coating, screen printing, metal mask printing and electrostatic coating. The applying may be typically followed by rolling with a flat press or a calendar roll, if necessary.

An electrode may be manufactured by the application to the metal foil, followed by drying at a temperature of 50 to 250° C. In the case of applying the mixture to double sides of the metal foil, after drying at 50 to 250° C. following the application to a single face, the other face to be applied is particularly preferably washed with water or the like. This washing can improve the adhesiveness greatly.

Paste on the metal foil, which is the mixture applied to a single face or double faces of the metal foil, followed by drying, is pressed with the metal foil, whereby an electrode can be made.

The negative electrode of the present invention may have various shapes such as a plate shape, a film shape, a cylindrical shape or molding on metal foil suitable for the battery to be obtained. Among them, the shape that is molding on the metal foil can be particularly applied to various batteries as a collector-integrated negative electrode.

A lithium-ion secondary battery including the graphite material as a negative electrode may be obtained by arranging the thus prepared negative electrode and a positive electrode for lithium-ion secondary battery so as to be opposed to each other via a separator, into which electrolyte solution is poured.

Examples of the active material used for the positive electrode include, but are not especially limited to, a metal compound, a metal oxide, a metal sulfide or a conductive polymer material capable of doping or intercalation with lithium ions, examples of which include lithium cobalt oxide ($LiCoO_2$), lithium nickel oxide ($LiNiO_2$), lithium manganase oxide ($LiMn_2O_4$), lithium complex oxides ($LiCo_xNi_yM_zO_2$, X+Y+Z=1, M denotes Mn, Al or the like), a material containing other elements instead of a part of the foregoing transition metal, lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M:Co, Ni, Mn or Fe), conductive polymers such as polyacetylene, polyaniline, polypyrrole, polythiophene and polyacene, porous carbon, and mixtures of the foregoing.

Examples of the separator to be used include nonwoven fabric, cloth and microporous film including mainly polyolefins such as polyethylene and polypropylene, as well as combinations thereof. It is not necessary to use the separator if the positive electrode and the negative electrode of the lithium ion secondary battery to be produced will not be in direct contact.

The electrolyte solutions and electrolytes used in the lithium-ion secondary battery may be well-known organic electrolyte solutions, inorganic solid electrolytes or polymer solid electrolytes. An organic electrolyte solution is preferable from the viewpoint of electrical conductivity.

Examples of organic electrolyte solutions include organic solvents including ethers such as dibutyl ether, ethyleneglycol monomethyl ether, ethyleneglycol monoethyl ether, ethyleneglycol monobutyl ether, diethyleneglycol monomethyl ether and ethyleneglycol phenyl ether; amides such as N-methylformamide, N,N-dimethylformamide, N-ethylformamide, N,N-diethylformamide, N-methylacetamide, N,N-dimethylacetamide, N-ethylacetamide and N,N-diethylacetamide; sulfur-containing compounds such as dimethyl sulfoxide and sulfolane; dialkylketones such as methyl ethyl ketone and methyl isobutyl ketone; cyclic ethers such as tetrahydrofuran and 2-methoxytetrahydrofuran; cyclic carbonates such as ethylene carbonate, butylene carbonate, propylene carbonate and vinylene carbonate; chain-like carbonates such as diethyl carbonate, dimethyl carbonate, methylethyl carbonate and methylpropyl carbonate; cyclic carbonate esters such as γ-butyrolactone and γ-valerolactone; chainlike carbonate esters such as methyl acetate, ethyl acetate, methyl propionate and ethyl propionate; N-methyl-2-pyrrolidinone; acetonitrile, nitromethane and the like. Any of these solvents may be used alone, or two or more thereof may be used in admixture.

Lithium salts may be used as solutes (electrolytes) in these solvents. Examples of typically known lithium salts include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$ and $LiN(C_2F_5SO_2)_2$.

Examples of the polymer solid electrolytes include polyethylene oxide derivatives and polymers including these derivatives, polypropylene oxide derivatives and polymers including these derivatives, phosphoric acid ester polymers, and polycarbonate derivatives and polymers including these derivatives.

EXAMPLES

The invention according to the present application will now be described in detail based on examples and comparative examples, with the understanding that these examples are in no way limitative on the invention.

1. Raw Coke Compositions and a Method for Producing Therefor (1) Raw Coke Composition A Atmospheric distillation residuum having the sulfur content of 3.1 mass % was hydrodesulfurized under the presence of a catalyst so that the hydrocracking ratio was 25% or less, thus obtaining hydrodesulfurization oil. Hydrodesulfurization conditions were the total pressure of 180 MPa, the hydrogen partial pressure of 160 MPa and the temperature of 380° C. Desulfurized vacuum light oil (having the content of sulfur of 500 mass-ppm and the density of 0.88 g/cm³ at 15° C.) was fluid catalytic cracked, thus obtaining fluid catalytic cracking residue oil. This fluid catalytic cracking residue oil was selective-extracted with dimethylformamide so as to be separated into an aromatic component and a saturated component, among which the aromatic component was extracted. To the mixture of this extracted aromatic component and the hydrodesulfurization oil at the mass ratio of 8:1, desulfurized deasphalted oil was added so as to be 19 mass % (the mixture as a whole containing the desulfurized and deasphalted oil itself was 100 mass %), thus obtaining a stock oil composition of coke. This stock oil composition was introduced to a delayed coker for coking under an inert gas atmosphere at 550° C., thus obtaining the raw coke composition A.

(2) Raw Coke Composition B

In the stock oil composition of the raw coke composition A, to the mixture of the extracted aromatic component and the hydrodesulfurization oil at the mass ratio of 8:1 was added desulfurized deasphalted oil so as to be 11 mass %, thus obtaining a stock oil composition of coke. This stock oil composition was introduced to a delayed coker under an inert gas atmosphere at 550° C., thus obtaining the raw coke composition B.

(3) Raw Coke Composition C

In the stock oil composition of the raw coke composition A, to the mixture of the extracted aromatic component and the hydrodesulfurization oil at the mass ratio of 8:1 was added desulfurized deasphalted oil so as to be 4 mass %, thus obtaining a stock oil composition of coke. This stock oil composition was introduced to a delayed coker under an inert gas atmosphere at 550° C., thus obtaining the raw coke composition C.

(4) Raw Coke Composition D

In the stock oil composition of the raw coke composition A, to the mixture of the extracted aromatic component and the hydrodesulfurization oil at the mass ratio of 6:1 was added desulfurized deasphalted oil so as to be 17 mass %, thus obtaining a stock oil composition of coke. This stock oil composition was introduced to a delayed coker under an inert gas atmosphere at 550° C., thus obtaining the raw coke composition D.

(5) Raw Coke Composition E

In the stock oil composition of the raw coke composition A, to the mixture of the extracted aromatic component and the hydrodesulfurization oil at the mass ratio of 6:1 was added desulfurized deasphalted oil so as to be 11 mass thus obtaining a stock oil composition of coke. This stock oil composition was introduced to a delayed coker under an inert gas atmosphere at 550° C., thus obtaining the raw coke composition E.

(6) Raw Coke Composition F

In the stock oil composition of the raw coke composition A, to the mixture of the extracted aromatic component and the hydrodesulfurization oil at the mass ratio of 6:1 was added desulfurized deasphalted oil so as to be 6 mass %, thus obtaining a stock oil composition of coke. This stock oil composition was introduced to a delayed coker under an inert gas atmosphere at 550° C., thus obtaining the raw coke composition F.

(7) Raw Coke Composition G

The hydrodesulfurization oil and the fluid catalytic cracking residue oil as raw materials of the stock oil composition of the raw coke composition A were mixed at the mass ratio of 1:5, to which was added desulfurized deasphalted oil so as to be 15 mass %, thus obtaining a stock oil composition of coke. This stock oil composition was introduced to a delayed coker under an inert gas atmosphere at 550° C., thus obtaining the raw coke composition G.

(8) Raw Coke Composition H

The hydrodesulfurization oil and the fluid catalytic cracking residue oil as raw materials of the stock oil composition of the raw coke composition A were mixed at the mass ratio of 1:5, to which was added desulfurized deasphalted oil so as to be 7 mass %, thus obtaining a stock oil composition of coke. This stock oil composition was introduced to a delayed coker under an inert gas atmosphere at 550° C., thus obtaining the raw coke composition H.

(9) Raw coke composition I

The hydrodesulfurization oil and the fluid catalytic cracking residue oil as raw materials of the stock oil composition of the raw coke composition A were mixed at the mass ratio of 1:4, to which was added desulfurized deasphalted oil so as to be 19 mass %, thus obtaining a stock oil composition of coke. This stock oil composition was introduced to a delayed coker under an inert gas atmosphere at 550° C., thus obtaining the raw coke composition I.

(10) Raw Coke Composition J

The hydrodesulfurization oil and the fluid catalytic cracking residue oil as raw materials of the stock oil composition of the raw coke composition A were mixed at the mass ratio of 1:4, to which was added desulfurized deasphalted oil so as to be 16 mass %, thus obtaining a stock oil composition of coke. This stock oil composition was introduced to a delayed coker under an inert gas atmosphere at 550° C., thus obtaining the raw coke composition J.

(11) Raw Coke Composition K

The hydrodesulfurization oil and the fluid catalytic cracking residue oil as raw materials of the stock oil composition of the raw coke composition A were mixed at the mass ratio of 1:4, to which was added desulfurized deasphalted oil so as to be 11 mass %, thus obtaining a stock oil composition of coke. This stock oil composition was introduced to a delayed coker under an inert gas atmosphere at 550° C., thus obtaining the raw coke composition K.

(12) Raw Coke Composition L

The hydrodesulfurization oil and the fluid catalytic cracking residue oil as raw materials of the stock oil composition of the raw coke composition A were mixed at the mass ratio of 1:4, to which was added desulfurized deasphalted oil so as to be 5 mass %, thus obtaining a stock oil composition of coke. This stock oil composition was introduced to a delayed coker under an inert gas atmosphere at 550° C., thus obtaining the raw coke composition L.

(13) Raw Coke Composition M

The hydrodesulfurization oil and the fluid catalytic cracking residue oil as raw materials of the stock oil composition of the raw coke composition A were mixed at the mass ratio of 1:4, to which was added desulfurized deasphalted oil so as to be 3 mass %, thus obtaining a stock oil composition of coke. This stock oil composition was introduced to a delayed coker under an inert gas atmosphere at 550° C., thus obtaining the raw coke composition M.

(14) Raw Coke Composition N

The hydrodesulfurization oil and the fluid catalytic cracking residue oil as raw materials of the stock oil composition of the raw coke composition A were mixed at the mass ratio of 1:3, to which was added desulfurized deasphalted oil so as to be 14 mass %, thus obtaining a stock oil composition of coke. This stock oil composition was introduced to a delayed coker under an inert gas atmosphere at 550° C., thus obtaining the raw coke composition N.

(15) Raw Coke Composition O

The hydrodesulfurization oil and the fluid catalytic cracking residue oil as raw materials of the stock oil composition of the raw coke composition A were mixed at the mass ratio of 1:3, to which was added desulfurized and deasphalted oil so as to be 7 mass %, thus obtaining a stock oil composition of coke. This stock oil composition was introduced to a delayed coker under an inert gas atmosphere at 550° C., thus obtaining the raw coke composition O.

(16) Raw Coke Composition P

To the fluid catalytic cracking residue oil as a raw material of the stock oil composition of the raw coke composition A was mixed n-heptane of the same volume for mixture, followed by selective extraction with dimethylformamide so as to be separated into an aromatic component and a saturated component, among which the saturated component was extracted. To the mixture of the fluid catalytic cracking residue oil and this saturated component at the mass ratio of 1:1, desulfurized deasphalted oil was added so as to be 16 mass %, thus obtaining a stock oil composition of coke. This stock oil composition was introduced to a delayed coker for coking under an inert gas atmosphere at 550° C., thus obtaining the raw coke composition P.

(17) Raw Coke Composition Q

To the mixture of the fluid catalytic cracking residue oil as a raw material of the stock oil composition of the raw coke composition P and the extracted saturated component at the mass ratio of 1:1, desulfurized deasphalted oil was added so as to be 11 mass %, thus obtaining a stock oil composition of coke. This stock oil composition was introduced to a delayed coker for coking under an inert gas atmosphere at 550° C., thus obtaining the raw coke composition Q.

(18) Raw Coke Composition R

To the mixture of the fluid catalytic cracking residue oil as a raw material of the stock oil composition of the raw coke composition P and the extracted saturated component at the mass ratio of 1:1, desulfurized deasphalted oil was added so as to be 6 mass %, thus obtaining a stock oil composition of coke. This stock oil composition was introduced to a delayed coker for coking under an inert gas atmosphere at 550° C., thus obtaining the raw coke composition R.

(19) Raw Coke Composition S

To the mixture of the fluid catalytic cracking residue oil as a raw material of the stock oil composition of the raw coke composition P and the extracted saturated component at the mass ratio of 1:2, desulfurized deasphalted oil was added so as to be 19 mass %, thus obtaining a stock oil composition of coke. This stock oil composition was introduced to a delayed coker for coking under an inert gas atmosphere at 550° C., thus obtaining the raw coke composition S.

(20) Raw Coke Composition T

To the mixture of the fluid catalytic cracking residue oil as a raw material of the stock oil composition of the raw coke composition P and the extracted saturated component at the mass ratio of 1:2, desulfurized deasphalted oil was added so as to be 10 mass %, thus obtaining a stock oil composition of coke. This stock oil composition was introduced to a delayed coker for coking under an inert gas atmosphere at 550° C., thus obtaining the raw coke composition T.

(21) Raw Coke Composition U

To the mixture of the fluid catalytic cracking residue oil as a raw material of the stock oil composition of the raw coke composition P and the extracted saturated component at the mass ratio of 1:2, desulfurized deasphalted oil was added so as to be 4 mass %, thus obtaining a stock oil composition of coke. This stock oil composition was introduced to a delayed coker for coking under an inert gas atmosphere at 550° C., thus obtaining the raw coke composition U.

Example 1

The thus obtained raw coke composition A was pulverized using a mechanical pulverizer ("Super Rotor Mill", product of Nisshin Engineering) and was classified using a precision air classifier ("Turbo Classifier", product of Nisshin Engineering), thus obtaining powder form raw coke composition with the average particle size of 10 μm. Compressive stress and shear stress were applied to this powder using Nobilta 130, product of Hosokawa Micron Corp. At this time, the number of rotations was 3,500 rpm, the processing time was 60 minutes and the processing temperature was 130° C. The circularity of the thus processed carbon material was measured using a flow particle imaging instrument FPIA-3000, product of Sysmex Corp, which was then carbonized using a roller hearth kiln, product of Takasago Industry Co., Ltd. under a nitrogen gas flow at the maximum achieving temperature of 1,200° C. to be held for 5 hours. The thus obtained carbonized material was put into a crucible, which was put in an electric furnace for graphitization in a nitrogen gas flow of 80 L/min and at the maximum achieving temperature of 2,800° C. The rate of temperature rise at this time was 200° C./hour, the maximum achieving temperature was held for 3 hours, and the rate of temperature fall was 100° C./hour until 1,000° C., which was then cooled to room temperature while maintaining the nitrogen flow.

Table 1 shows Examples 1 to 14 and Comparative Examples 1 to 22. Table 1 shows the types of raw coke compositions and values of H/C, micro-strength, average particle size after pulverization and classification of the raw coke compositions, conditions to give compressive stress and shear stress to the raw coke compositions (devices, the number of rotations or the circumferential velocity and processing time), the average circularity of round powder after receiving compressive stress and shear stress and the size Lc(112) and lattice distortion ε of the crystallites obtained by X-ray wide-angle diffractometry for graphite powder.

In Examples 2 to 14 and Comparative Examples 1 to 17 and 19 to 22, the raw coke compositions described in Table 1 were pulverized and classified to be the average particle size described in the table, to which a surface treatment was performed with the devices and under the conditions (devices, the number of rotations or the circumferential velocity and processing time) described in the table to obtain the round powder with the average circularity described in the table, and thereafter similarly to Example 1, the round powder was carbonized and graphitized, thus obtaining graphite materials. Other than the devices for surface treatment, the same devices as described in Example 1 were used.

In Comparative Example 18, the raw coke composition described in Table 1 was pulverized and classified to be the average particle size described in the table, which was then carbonized and graphitized similarly to Example 1 without performing a surface treatment, thus obtaining a graphite material. The devices used were the same devices as described in Example 1.

Figure 2:
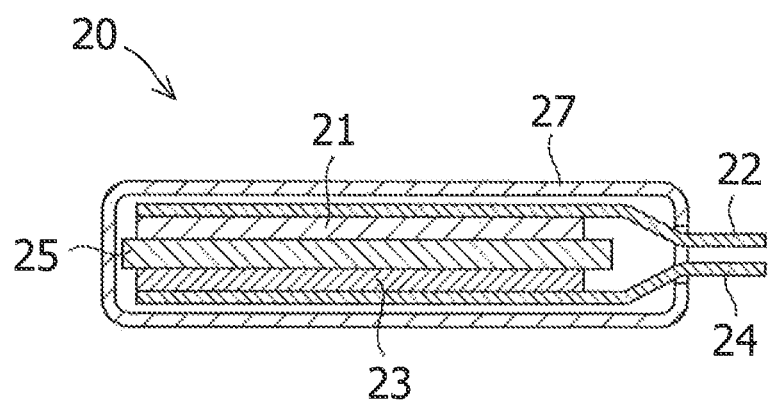
FIG. 2 schematically shows a cross-section of a cell used for battery evaluation examinations in the present examples.

Fabrication of Batteries and Method for Evaluating their Characteristics (1) Method for Fabricating Batteries FIG. 2 is a sectional-view of a fabricated battery 20. A positive electrode 21 was a sheet electrode formed by mixing lithium nickel oxide (produced by Toda Kogyo Corp., $LiNi_{0.8}Co_{0.15}Al_{0.05}O_2$) with the average particle size of 6 μm as a positive electrode material, polyvinylidene fluoride (produced by Kureha Corporation, KF#1320) as a binder and acetylene black (Denka black produced by Denki Kagaku Kogyo K.K.) at the weight ratio of 89:6:5, to which N-methyl-2-pyrrolidinone was added and kneaded, was made into a paste-form and was applied to a side face of aluminum foil of 30 μm in thickness, followed by drying and rolling, and was cut so that the size of the applied part was 30 mm in width and 50 mm in length. The amount applied per unit area was set at 10 mg/cm$^2$ as the mass of lithium nickel oxide.

At a part of this sheet electrode, the positive electrode mixture was scraped off orthogonally to the longitudinal direction of the sheet, and the thus exposed aluminum foil was connected with a collector (aluminum foil) of the applied part in an integral manner, thus playing a role as a positive electrode lead plate.

A negative electrode 23 was a sheet electrode formed by mixing the graphite powder obtained in the below-described examples and comparative examples as negative electrode materials, polyvinylidene fluoride (produced by Kureha Corporation, KF#9310) as a binder and acetylene black (Denka black produced by Denki Kagaku Kogyo K.K.) at the weight ratio of 90:2:8, to which N-methyl-2-pyrrolidinone was added and kneaded, was made into a paste-form and was applied to a side face of copper foil of 18 μm in thickness, followed by drying and rolling, and was cut so that the size of the applied part was 32 mm in width and 52 mm in length. The amount applied per unit area was set at 6 mg/cm$^2$ as the mass of graphite powder.

At a part of this sheet electrode, the negative electrode mixture was scraped off orthogonally to the longitudinal direction of the sheet, and the thus exposed copper foil was connected with a collector (copper foil) of the applied part in an integral manner, thus playing a role as a negative electrode lead plate.

The battery 20 was fabricated by drying the positive electrode 21, the negative electrode 23, a separator 25, an outer casing 27 and other components sufficiently, which were introduced into a glove box filled with argon gas having the dew point of –100° C. for assembly. As the drying conditions, the positive electrode 21 and the negative electrode 23 were dried at 150° C. under a vacuum state for 12 hours or longer, and the separator 25 and other components were dried at 70° C. under a vacuum state for 12 hours or longer.

The thus dried positive electrode 21 and negative electrode 23 were laminated so that the application part of the positive electrode and the application part of the negative electrode were opposed via micro-porous film (produced by Celgard Corp. #2400) made of polypropylene, which was fixed with a polyimide tape. Herein, the positive electrode and the negative electrode are laminated so that the perimeter part of the positive electrode application part that was projected onto the application part of the negative electrode was surrounded inside the perimeter part of the negative electrode application part. The thus obtained single-layer electrode body was embedded in an aluminum lamination film, to which electrolyte solution was poured, and the laminate film was heat-sealed while letting the aforementioned positive electrode/negative electrode lead plates stick out, thus fabricating a sealed single-layer laminate battery. The electrolyte solution used was obtained by dissolving lithium hexafluorophosphate ($LiPF_6$) in the solvent including the mixture of ethylene carbonate and ethylmethyl carbonate at the volume ratio of 3:7 so that the density was 1 mol/L.

(2) Method for Evaluating Batteries

The thus obtained batteries were set at a constant temperature room at 25° C., and the following charge and discharge experiment was conducted. Firstly charge was conducted at a constant current of 1.5 mA until the battery voltage reached 4.2 V. After a 10-minute pause, discharge was conducted at a constant current of the same current until the battery voltage reached 3.0 V, and such a charge and discharge cycle was repeated 10 times. Since this charge and discharge cycle was to check for abnormality of the batteries, this was not included in the number of cycles for the charge and discharge experiment. It was found that all of the batteries fabricated in the present embodiment were free from abnormality.

These batteries were set at a constant temperature room at 60° C., which were left standing for 5 hours, and the charge and discharge experiment was started. The first cycle after starting was the initial cycle. Charge was conducted at a constant current of 75 mA until the battery voltage reached 4.2 V. After 1-minute pause, discharge was conducted at a constant current of the same current until the battery voltage reached 3.0 V, and such a charge and discharge cycle was repeated 1,000 times. The ratio (%) of the discharge capacity at the 1,000th cycle to the initial discharge capacity was calculated as the capacity maintenance ratio of the charge and discharge cycle.

Table 1 shows the discharge capacity (mAh) at the first cycle, the discharge capacity (mAh) at the $1,000^{th}$ cycle and the capacity maintenance ratio (%) after the $1,000^{th}$ cycle of the batteries, which were fabricated using the graphite materials described as Examples and Comparative Examples in Table 1.

TABLE 1

| | Raw coke Composition | H/C of Raw coke Composition | Micro-Strength of Raw coke Composition | Average Particle Size (μm) | Surface Treatment Conditions | | | | Physical Properties of Graphite Materials | | Battery Characteristics | | |
|---|---|---|---|---|---|---|---|---|---|---|---|---|---|
| | | | | | Devices | Number of Rotations rpm | Circumferential Velocity m/s | Time min | Average Circularity of Round powder | Lc (112) (nm) | Lattice Distortion ε | Discharge Capacity at $1^{st}$ Cycle (mAh) | Discharge Capacity at $1000^{th}$ Cycle (mAh) | Capacity Maintenance Ratio after 1000 cycles (%) |
| Example 1 | K | 0.40 | 12 | 10 | Nobilta | 3500 | — | 60 | 0.91 | 23 | 0.001 | 21.9 | 20.0 | 91.5 |
| Example 2 | G | 0.32 | 17 | 12 | Nobilta | 3500 | — | 120 | 0.92 | 19 | 0.047 | 20.7 | 19.4 | 93.6 |
| Example 3 | H | 0.30 | 7 | 12 | Nobilta | 3500 | — | 60 | 0.91 | 9.8 | 0.085 | 17.9 | 17.1 | 95.6 |
| Example 4 | O | 0.49 | 8 | 18 | Nobilta | 3500 | — | 60 | 0.95 | 18 | 0.001 | 20.4 | 18.6 | 91.2 |
| Example 5 | H | 0.30 | 7 | 18 | Nobilta | 2500 | — | 90 | 0.95 | 8.2 | 0.048 | 17.5 | 16.0 | 91.4 |
| Example 6 | N | 0.50 | 16 | 22 | Nobilta | 3500 | — | 10 | 0.95 | 20 | 0.085 | 22.0 | 20.6 | 93.6 |
| Example 7 | N | 0.50 | 16 | 25 | Nobilta | 2000 | — | 180 | 0.97 | 9.8 | 0.001 | 17.9 | 16.3 | 91.0 |
| Example 8 | K | 0.40 | 12 | 20 | Nobilta | 3500 | — | 90 | 0.97 | 5.1 | 0.050 | 17.3 | 16.0 | 92.5 |
| Example 9 | O | 0.49 | 8 | 21 | Nobilta | 3500 | — | 90 | 0.97 | 4.0 | 0.085 | 16.9 | 16.0 | 94.8 |
| Example 10 | K | 0.40 | 12 | 15 | Nobilta | 3500 | — | 60 | 0.94 | 30 | 0.043 | 23.1 | 21.2 | 91.6 |
| Example 11 | K | 0.40 | 12 | 5 | Nobilta | 5000 | — | 90 | 0.91 | 21 | 0.002 | 21.3 | 19.7 | 92.7 |
| Example 12 | K | 0.40 | 12 | 15 | COMPOSI | — | 76 | 60 | 0.93 | 7.1 | 0.048 | 17.3 | 16.1 | 93.2 |
| Example 13 | H | 0.30 | 7 | 15 | COMPOSI | — | 76 | 60 | 0.92 | 5.9 | 0.083 | 17.0 | 16.0 | 93.9 |
| Example 14 | K | 0.40 | 12 | 15 | Mechano-fusion | 2650 | — | 60 | 0.91 | 8.6 | 0.081 | 17.6 | 16.2 | 92.2 |
| Comp. Ex. 1 | D | 0.29 | 18 | 12 | Nobilta | 3500 | — | 60 | 0.82 | 3.4 | 0.0008 | 15.7 | 14.4 | 92.0 |
| Comp. Ex. 2 | Q | 0.52 | 13 | 12 | Nobilta | 3500 | — | 90 | 0.92 | 3.3 | 0.012 | 15.5 | 14.1 | 91.0 |
| Comp. Ex. 3 | R | 0.51 | 5 | 14 | Nobilta | 3500 | — | 120 | 0.96 | 3.1 | 0.072 | 15.4 | 14.0 | 91.1 |
| Comp. Ex. 4 | S | 0.73 | 21 | 12 | Nobilta | 3500 | — | 90 | 0.92 | 3.0 | 0.011 | 15.3 | 14.0 | 91.8 |
| Comp. Ex. 5 | P | 0.53 | 18 | 12 | Nobilta | 3500 | — | 60 | 0.90 | 2.5 | 0.0009 | 15.2 | 14.0 | 92.2 |
| Comp. Ex. 6 | U | 0.66 | 4 | 15 | Nobilta | 3500 | — | 120 | 0.97 | 2.4 | 0.093 | 14.8 | 13.5 | 91.5 |
| Comp. Ex. 7 | T | 0.70 | 11 | 13 | Nobilta | 3500 | — | 90 | 0.91 | 3.9 | 0.0010 | 15.9 | 14.5 | 91.0 |
| Comp. Ex. 8 | D | 0.29 | 18 | 18 | Nobilta | 3500 | — | 60 | 0.95 | 28 | 0.0003 | 21.1 | 13.7 | 65.1 |
| Comp. Ex. 9 | F | 0.25 | 6 | 18 | Nobilta | 3500 | — | 60 | 0.92 | 25 | 0.0005 | 21.8 | 14.4 | 66.2 |
| Comp. Ex. 10 | A | 0.23 | 25 | 12 | Nobilta | 3500 | — | 60 | 0.88 | 23 | 0.0005 | 20.9 | 13.8 | 65.8 |
| Comp. Ex. 11 | C | 0.15 | 4 | 10 | Nobilta | 3500 | — | 60 | 0.86 | 26 | 0.0008 | 20.7 | 13.9 | 67.3 |
| Comp. Ex. 12 | E | 0.27 | 13 | 12 | Nobilta | 3500 | — | 60 | 0.90 | 22 | 0.0004 | 21.6 | 14.1 | 65.1 |
| Comp. Ex. 13 | B | 0.18 | 12 | 11 | Nobilta | 3500 | — | 90 | 0.89 | 24 | 0.0004 | 20.5 | 13.1 | 63.9 |
| Comp. Ex. 14 | I | 0.43 | 23 | 10 | Nobilta | 3500 | — | 60 | 0.88 | 23 | 0.0007 | 21.2 | 15.9 | 75 |
| Comp. Ex. 15 | J | 0.41 | 19 | 17 | Nobilta | 3500 | — | 60 | 0.90 | 24 | 0.0009 | 22.2 | 17.1 | 77.2 |
| Comp. Ex. 16 | L | 0.39 | 6 | 22 | Nobilta | 3500 | — | 60 | 0.91 | 12 | 0.0008 | 18.6 | 14.7 | 79.2 |
| Comp. Ex. 17 | M | 0.38 | 3 | 12 | Nobilta | 3500 | — | 120 | 0.92 | 11 | 0.0007 | 18.3 | 14.7 | 80.3 |
| Comp. Ex. 18 | K | 0.40 | 12 | 15 | — | — | — | — | — | 25 | 0.0002 | 20.8 | 13.2 | 63.3 |
| Comp. Ex. 19 | K | 0.40 | 12 | 4 | Nobilta | 4000 | — | 90 | 0.74 | 26 | 0.0005 | 21.0 | 14.1 | 67.2 |
| Comp. Ex. 20 | K | 0.40 | 12 | 15 | Nobilta | 1450 | — | 120 | 0.81 | 23 | 0.0007 | 21.9 | 15.2 | 69.4 |
| Comp. Ex. 21 | K | 0.40 | 12 | 15 | COMPOSI | — | 45 | 90 | 0.89 | 10 | 0.0009 | 17.9 | 14.7 | 81.9 |
| Comp. Ex. 22 | K | 0.40 | 12 | 15 | Nobilta | 5000 | — | 9 | 0.90 | 16 | 0.0009 | 18.1 | 14.5 | 79.9 |

In Examples 1 to 14, the raw coke compositions (G, H, K, N, O) in the range of the present invention, i.e., having the H/C value of 0.3 to 0.5 and the micro-strength of 7 to 17 mass % were used as raw materials, to which a surface treatment was performed so that the average circularity was 0.91 to 0.97, thus obtaining round powder. Then, the round powder was graphitized. Such graphite materials satisfied the claimed range of the present invention, i.e., the size Lc(112) of crystallites of 4 nm to 30 nm, the size Lc(112) being calculated from a (112) diffraction line obtained by X-ray wide-angle diffractometry, and the lattice distortion $\epsilon$ of 0.001 to 0.085. Batteries including these graphite materials as their negative electrodes had the capacity maintenance ratio of 91% or more, thus being lithium-ion secondary batteries having very excellent service life characteristics.

As the devices for surface treatment, Examples 1 to 11 used Nobilta and Examples 12, 13 used COMPOSI and Example 14 used Mechanofusion. As a result, the graphite materials fabricated using any of these devices for surface treatment satisfied the claimed range of the present invention for Lc(112) and lattice distortion, and it was found that batteries including these graphite materials as their negative electrodes showed high values of capacity maintenance ratio. With these devices for surface treatment, appropriate lattice distortion was successfully introduced to graphite materials.

The graphite materials obtained by the manufacturing methods of Comparative Examples 1 to 7 had Lc(112) less than 4 nm. It was found that smaller size Lc(112) of the crystallites of the graphite materials made discharge capacity smaller. It was understood that, in order to secure 16 mAh for the capacity of a battery of this size, the size Lc(112) of the crystallites of a graphite material used for a negative electrode has to be 4 nm or more. Comparative Examples 1 to 7 all had the capacity maintenance ratio of 91% or more after the 1,000th cycle, and so these graphite materials can be said as materials for negative electrodes that achieve high-level of cycle stability. However, since the size of the crystallites was small, batteries including them had smaller capacity, and so such graphite materials are not favorable.

The graphite materials obtained by the manufacturing methods of Comparative Examples 8 to 22 had Lc(112) of 4 nm or more, but had the lattice distortion $\epsilon$ less than 0.001. Lithium-ion secondary batteries including these graphite materials as their negative electrodes had the discharge capacity of 17 mAh or more, and so the graphite materials can be said as materials for negative electrodes that achieve very high discharge capacity. However, since the lattice distortion $\epsilon$ was small, the capacity maintenance ratio during charge and discharge cycles decreased, and so such graphite materials are not favorable.

From these results, the range claimed in the present invention for graphite materials, i.e., satisfying Lc(112) of 4 nm to 30 nm and lattice distortion $\epsilon$ of 0.001 to 0.085, can be said as essential conditions to achieve high capacity of 16 mAh or more and high capacity maintenance ratio of 91% or more.

Among these graphite materials, Comparative Examples 8 to 13 include the raw coke compositions having H/C less than 0.30, and so crystallites easily grew, meaning less lattice distortion introduced. As a result, the graphite materials obtained failed to have lattice distortion in the claimed range. Since these graphite materials had the size Lc(112) of crystallites of 4 nm or more, they can be said as materials for negative electrode that achieve very high discharge capacity. However, since the lattice distortion was small, the capacity maintenance ratio during charge and discharge cycles decreased, and so such graphite materials are not favorable.

Comparative Examples 14 and 15 included raw coke compositions having H/C in the claimed range but having the micro-strength of 17 mass % or higher. Such raw coke compositions have a strong binding force between unorganized carbons and continuously grow irrespective of their particle shape, and so the aforementioned shape effect of particles cannot be exerted, and graphite materials having the lattice distortion $\epsilon$ of 0.001 or more cannot be obtained, and so such graphite materials are not favorable.

Comparative Examples 16 and 17 included raw coke compositions having H/C in the claimed range but having the micro-strength less than 7 mass %. Such raw coke compositions are extremely poor in binding between crystallites, and so cannot keep the particle shape, and thus graphitization progresses while decreasing the curvature of the particle surface. As a result, appropriate lattice distortion cannot be introduced to the graphite materials, thus decreasing the capacity maintenance ratio during charge and discharge cycles, and so such graphite materials are not favorable.

From these results, the range claimed in the present invention for raw coke compositions, i.e., satisfying the H/C atomic ratio of 0.30 to 0.50 and the micro-strength of 7 to 17 mass %, can be said as essential conditions to achieve the high capacity maintenance ratio of 91% or more.

In Comparative Example 18, the raw coke composition in the claimed range was carbonized and graphitized without performing a surface treatment. Graphitization of this graphite material, not subjected to a surface treatment, easily processed, and Lc(112) had a large value up to 25 nm. On the other hand, the lattice distortion $\epsilon$ was a very small value of 0.0002, from which it was found that no lattice distortion was introduced. A battery including this graphite material as the negative electrode showed a very small value of 63.3% after charge and discharge cycles. The graphite materials (Examples 10, 12 and 14), which included the same raw coke composition as Comparative Example 18, to which a surface treatment was performed to obtain round powder, and were obtained by graphitization of the round powder, had the lattice distortion $\epsilon$ of 0.043 or more. Then, batteries including these graphite materials as the negative electrodes showed a value of 91% or more as the capacity maintenance ratio after charge and discharge cycles. From these results, the surface treatment performed to raw coke compositions can be said as an essential step for the manufacturing method of a graphite material achieving a high capacity maintenance ratio of 91% or more.

In Comparative Example 19, the raw coke composition in the claimed range was pulverized and classified to obtain powder with the average particle size of 4 μm, and the powder was then subjected to a treatment using a device for surface treatment, Nobilta, with the number of rotations of 4,000 rpm for 90 minutes, thus obtaining round powder, followed by graphitization. At this time, since the powder-form raw coke composition had a small particle size, the surface treatment was not enough, causing the lattice distortion $\epsilon$ of 0.0005, which was smaller than the claimed range of the present invention. Then, a lithium-ion secondary battery using this graphite material as the negative electrode had the capacity maintenance ratio after charge and discharge cycles of a small value of 67.2%, and so such graphite material is not favorable.

In Comparative Example 20, the raw coke composition in the claimed range was pulverized and classified to obtain powder with the average particle size of 15 μm, and the powder was then subjected to a treatment using a device for surface treatment, Nobilta, with the number of rotations of 1,450 rpm for 120 minutes, thus obtaining round powder, followed by graphitization. At this time, since the number of rotations of Nobilta was small, the surface treatment was not enough, causing the lattice distortion ε of 0.0007, which was smaller than the claimed range of the present invention. Then, a lithium-ion secondary battery using this graphite material as the negative electrode had the capacity maintenance ratio after charge and discharge cycles of a small value of 69.4%, and so such graphite material is not favorable.

In Comparative Example 21, the raw coke composition in the claimed range was pulverized and classified to obtain powder with the average particle size of 15 μm, and the powder was then subjected to a treatment using a device for surface treatment, COMPOSI, with the circumferential velocity of 45 m/s for 90 minutes, thus obtaining round powder, followed by graphitization. At this time, since the number of rotations was small, the surface treatment was not enough, causing the lattice distortion ε of 0.0009, which was smaller than the claimed range of the present invention. Then, a lithium-ion secondary battery using this graphite material as the negative electrode had the capacity maintenance ratio after charge and discharge cycles of a small value of 81.9%, and so such graphite material is not favorable.

In Comparative Example 22, the raw coke composition in the claimed range was pulverized and classified to obtain powder with the average particle size of 15 μm, and the powder was then subjected to a treatment using a device for surface treatment, Nobilta, with the number of rotations of 5,000 rpm for 9 minutes, thus obtaining round powder, followed by graphitization. At this time, since the processing time by Nobilta was short, the surface treatment was not enough, causing the lattice distortion ε of 0.0009, which was smaller than the claimed range of the present invention. Then, a lithium-ion secondary battery using this graphite material as the negative electrode had the capacity maintenance ratio after charge and discharge cycles of a small value of 79.9%, and so such graphite material is not favorable.

As stated above, a graphite material is obtained by a manufacturing method including the steps of: pulverizing and classifying a raw coke composition subjected to coking by delayed coking process, the raw coke composition having a H/C atomic ratio that is a ratio of hydrogen atoms H and carbon atoms C of 0.30 to 0.50 and having a micro-strength of 7 to 17 mass % to obtain powder of the raw coke composition; giving compressive stress and shear stress to the powder of the raw coke composition so that average circularity is 0.91 to 0.97 to obtain round powder; heating the round powder to obtain a carbonized composition; and graphitizing the carbonized composition. The graphite material obtained has a size of a crystallite Lc(112) of 4 nm to 30 nm, the size being calculated from a (112) diffraction line obtained by X-ray wide-angle diffractometry and having lattice distortion in the range from 0.001 to 0.085, the lattice distortion being calculated from a (004) diffraction line and a (006) diffraction line.

Then, a lithium-ion secondary battery including such a graphite material for negative electrode as the negative electrode can secure capacity of 16 mAh or more and achieve capacity maintenance ratio of 91% or more after the 1,000th charge and discharge cycle at 60° C.

A lithium-ion secondary battery including the graphite material of the present invention can secure higher-degree of reliability compared with a lithium-ion secondary battery including a conventional graphite material, and thus such a lithium-ion secondary battery is applicable to vehicles, specifically to hybrid vehicles, plug-in hybrid vehicles and electric vehicles as well as to industry such as electricity storage for electric system infrastructure.

It should be noted that the entire contents of Japanese Patent Application No. 2010-228988 filed on Oct. 8, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A graphite material having lattice distortion for lithium-ion secondary battery negative electrode, the graphite material being obtained by a manufacturing method comprising the steps of:
    pulverizing and classifying a raw coke composition obtained from a heavy-oil composition undergone coking by delayed coking process, the raw coke composition having a H/C atomic ratio that is a ratio of hydrogen atoms H and carbon atoms C of 0.30 to 0.50 and having a micro-strength of 7 to 17 mass % to obtain powder of the raw coke composition;
    giving compressive stress and shear stress to the powder of the raw coke composition so that average circularity is 091 to 0.97 to obtain round powder;
    heating the round powder to obtain a carbonized composition; and
    graphitizing the carbonized composition,
    wherein
    the graphite material has a size of a crystallite Lc(112) of 4 nm to 30 nm, the size being calculated from a (112) diffraction line obtained by X-ray wide-angle diffractometry, and has lattice distortion in the range from 0.001 to 0.085, the lattice distortion being calculated from a (004) diffraction line and a (006) diffraction line.

2. A lithium ion secondary battery including the graphite material for lithium-ion secondary battery negative electrode according to claim 1 as a negative electrode material.

* * * * *